US008621626B2

(12) United States Patent
Alme

(10) Patent No.: US 8,621,626 B2
(45) Date of Patent: Dec. 31, 2013

(54) DETECTION OF CODE EXECUTION EXPLOITS

(75) Inventor: Christoph Alme, Paderborn (DE)

(73) Assignee: McAfee, Inc., Santa Clara, CA (US)

(*) Notice: Subject to any disclaimer, the term of this patent is extended or adjusted under 35 U.S.C. 154(b) by 454 days.

(21) Appl. No.: 12/627,786

(22) Filed: Nov. 30, 2009

(65) Prior Publication Data
US 2010/0281540 A1 Nov. 4, 2010

Related U.S. Application Data

(60) Provisional application No. 61/174,555, filed on May 1, 2009.

(51) Int. Cl.
*G06F 21/00* (2013.01)
(52) U.S. Cl.
USPC .............. 726/23; 713/187; 713/188; 713/194
(58) Field of Classification Search
USPC .......................................................... 726/23
See application file for complete search history.

(56) References Cited

U.S. PATENT DOCUMENTS

| 7,065,789 | B1* | 6/2006 | Neyman et al. .................. 726/24 |
| 7,197,534 | B2 | 3/2007 | Donoho et al. |
| 7,533,376 | B2 | 5/2009 | Anwar et al. |
| 7,552,479 | B1 | 6/2009 | Conover et al. |
| 7,617,531 | B1 | 11/2009 | Chauhan et al. |
| 7,827,612 | B2 | 11/2010 | Saito |
| 7,849,507 | B1 | 12/2010 | Bloch et al. |
| 8,051,479 | B1 | 11/2011 | Bu et al. |
| 2002/0157008 | A1* | 10/2002 | Radatti ........................ 713/188 |
| 2003/0065926 | A1 | 4/2003 | Schultz et al. |
| 2003/0115485 | A1* | 6/2003 | Milliken ....................... 713/201 |
| 2003/0172293 | A1 | 9/2003 | Johnson et al. |
| 2003/0200464 | A1* | 10/2003 | Kidron .......................... 713/201 |
| 2003/0208723 | A1* | 11/2003 | Killian et al. ..................... 716/1 |
| 2004/0128355 | A1* | 7/2004 | Chao et al. .................... 709/206 |
| 2004/0158729 | A1 | 8/2004 | Szor |
| 2005/0177736 | A1* | 8/2005 | de los Santos et al. ....... 713/188 |
| 2005/0223238 | A1 | 10/2005 | Schmid et al. |
| 2005/0262556 | A1* | 11/2005 | Waisman et al. ............... 726/22 |

(Continued)

FOREIGN PATENT DOCUMENTS

WO 2007/117567 10/2007

OTHER PUBLICATIONS

Fiskiran et al., Runtime Execution Monitoring (REM) to Detect and Prevent Malicious Code Execution, Oct. 2004, IEEE International Conference on Computer Design: VLSI in Computers and Processors 2004, pp. 452-457.*

(Continued)

*Primary Examiner* — David Pearson
*Assistant Examiner* — Kenneth Chang
(74) *Attorney, Agent, or Firm* — Wong, Cabello, Lutsch, Rutherford & Brucculeri, LLP.

(57) ABSTRACT

Various embodiments include a method of detecting shell code in an arbitrary file comprising determining where one or more candidate areas exist within an arbitrary file, searching at least one nearby area surrounding each of the one or more candidate areas within the arbitrary file for an instruction candidate, and calculating for any such instruction candidate a statistical probability based on a disassembly of instructions starting at a found offset for the instruction candidate that the disassembled instructions are shellcode.

22 Claims, 7 Drawing Sheets

(56) References Cited

U.S. PATENT DOCUMENTS

| | | | |
|---|---|---|---|
| 2005/0283838 A1* | 12/2005 | Saito | 726/24 |
| 2006/0037080 A1 | 2/2006 | Maloof | |
| 2006/0288420 A1 | 12/2006 | Mantripragada et al. | |
| 2007/0043531 A1* | 2/2007 | Kosche et al. | 702/182 |
| 2007/0074287 A1* | 3/2007 | Abad | 726/22 |
| 2007/0152854 A1* | 7/2007 | Copley | 341/51 |
| 2007/0240222 A1* | 10/2007 | Tuvell et al. | 726/24 |
| 2008/0022405 A1 | 1/2008 | Wang et al. | |
| 2008/0052468 A1 | 2/2008 | Speirs et al. | |
| 2008/0071783 A1 | 3/2008 | Langmead et al. | |
| 2008/0209557 A1 | 8/2008 | Herley et al. | |
| 2009/0013405 A1 | 1/2009 | Schipka | |
| 2009/0083852 A1* | 3/2009 | Kuo et al. | 726/22 |
| 2009/0126012 A1* | 5/2009 | Treadwell et al. | 726/22 |
| 2009/0150999 A1* | 6/2009 | Dewey et al. | 726/24 |
| 2010/0064367 A1 | 3/2010 | Hansen | |
| 2010/0281540 A1 | 11/2010 | Alme | |

OTHER PUBLICATIONS

Huang, Hsiang-Lun, et al. "A Polymorphic Shellcode Detection Mechanism in the Network". 2007. pp. 1-7. Proceedings of the 2nd international conference on Scalable information systems, Article No. 64, InfoScale '07.

Kienzle, Darrell M. and Elder, Matthew C. "Recent Worms: A Survey and Trends". 2003. pp. 1-10. Proceedings of the 2003 ACM workshop on Rapid malcode WORM'03.

Vasudevan, Amit, and Yerraballi, Ramesh. "SPiKE: Engineering Malware Analysis Tools using Unobtrusive Binary-Instrumentation". 2006. pp. 1-10, vol. 48, ACSC, '06 Proceedings of the 29th Australasian Computer Science Conference.

Christodorescu, Mihai, and Jha Somesh. "Testing Malware Detectors". 2004. pp. 1-12. Proceedings of the 2004 ACM SIGSOFT international symposium on Software testing and analysis, ISSTA '04, vol. 29, Issue 4.

* cited by examiner

| | CURRENT INSTRUCTION IS: | | THEN IN % OF TRAINING CASES... | SUCCESSOR WILL BE: |
|---|---|---|---|---|
| | CMP reg, mem | | 97.4% | Jcc imm |
| | CMP reg, reg | | 93.6% | Jcc imm |
| | XOR reg, imm | | 82.2% | STOSB |
| | LODSB | | 69.8% | XOR reg, imm |
| | JMP imm | | 53.3% | CALL imm |
| | CALL imm | | 48.2% | POP reg |
| | XOR reg, mem | | 38.5% | INC reg |
| | STOSB | | 37.1% | DEC reg |
| | PUSH imm | | 30.4% | POP reg |
| | LEA reg, mem | | 30.9% | PUSH reg |

Fig. 6

DETECTION OF CODE EXECUTION EXPLOITS

RELATED APPLICATIONS

This patent application claims the priority benefit of U.S. Provisional Application Ser. No. 61/174,555 filed May 1, 2009 and entitled "DETECTION OF CODE EXECUTION EXPLOITS", the content of which is incorporated herein by reference in its entirety.

FIELD OF THE INVENTION

The present invention is related to computer network security, and more particularly, to systems and methods for detection code execution exploits.

BACKGROUND INFORMATION

Today, "Zero-Day" vulnerabilities and other forms of code execution exploits remain a dangerous threat to computer users connected to the internet. Such undisclosed vulnerabilities are sold, or get published by self-styled "security researchers", and can then be used to infect users by sending them a (link to a) specially crafted document that will be opened/rendered by the vulnerable client software.

In 2006 and in the first half of 2007, Microsoft's Office™ document formats have been the primary targets for vulnerability exploitation, followed by Microsoft's™ legacy graphics formats WMF, ANI and ICO. Exploits based on non-Microsoft™ formats, such as Apple QuickTime™, exist in the wild and are growing in prevalence.

Yet it is not possible to know about vulnerabilities in advance; they would not exist if this was possible.

BRIEF DESCRIPTION OF THE DRAWINGS

FIG. 6 illustrates a table of values representing a Markov Model for code; and

DETAILED DESCRIPTION OF THE INVENTION

In the following detailed description, reference is made to the accompanying drawings which form a part hereof, and in which is shown by way of illustration specific embodiments in which the invention can be practiced. It is to be understood that other embodiments may be utilized and structural changes can be made without departing from the scope of the present invention.

Embodiments of the invention include system and methods for detection of code execution exploits. Code execution exploits include, but are not limited to various types of malware, such as exploits for stack buffer overflow vulnerabilities, heap buffer overflow vulnerability, and integer overflow vulnerabilities. In various instances, the malware is a version or is a variation that is unknown at the time it is received on a system or a computer that is the intended target of the code execution exploit, and therefore is unlikely to be detected by anti-malware detection systems that look for already know types of code execution vulnerabilities. Embodiments described herein include system and methods that allow for probabilistic detection of both known and unknown variations of malware.

Figure 1:
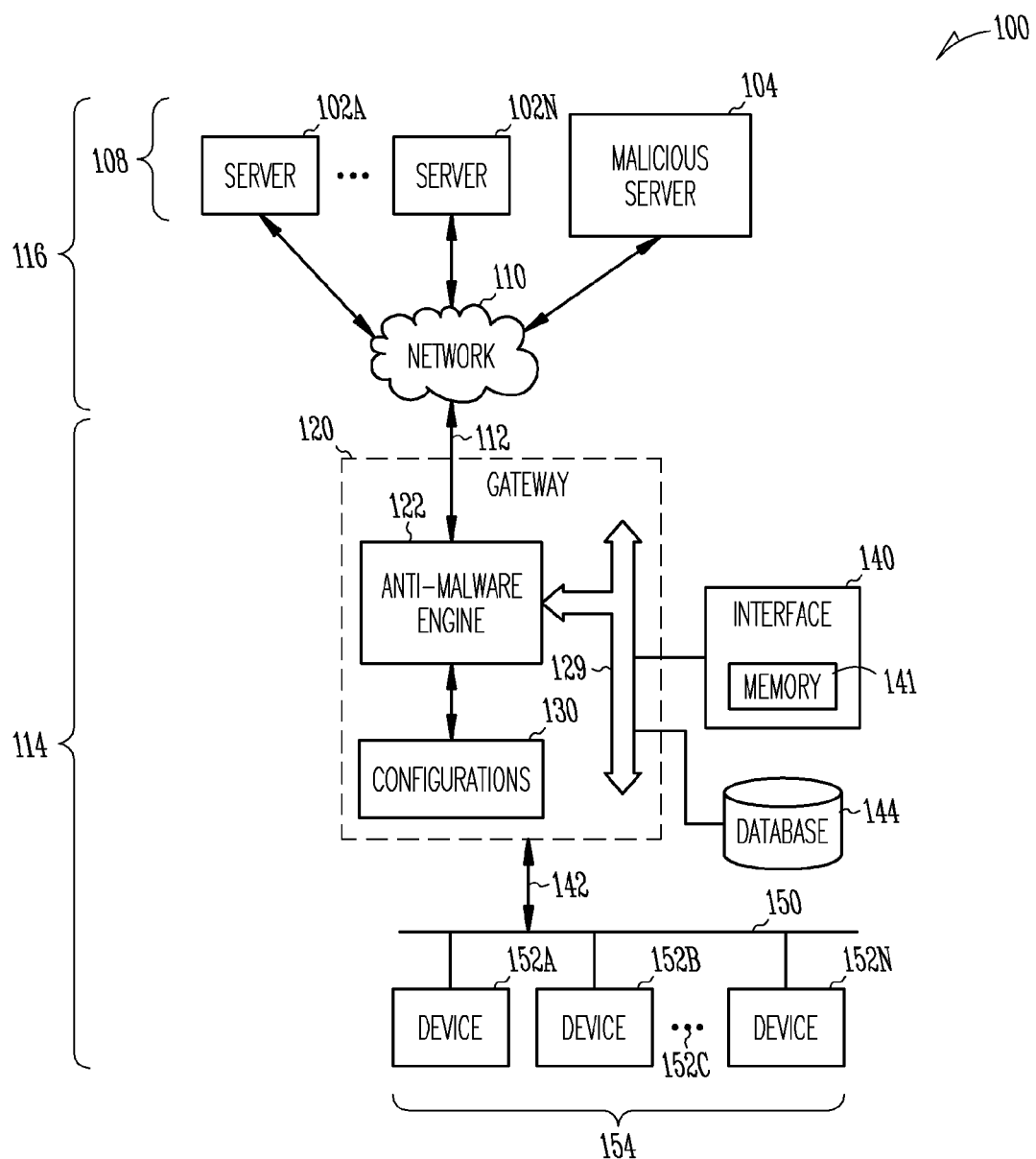
FIG. 1 illustrates a computer network according to various embodiments.

FIG. 1 illustrates a computer network 100 according to various embodiments. Computer network 100 includes a protected portion 114 coupled to an external portion 116. The protected portion 114 is considered to be protected in that the various embodiments of the systems and methods described herein are used to detect shellcode present in files entering into, or residing on, protected portion 114. External portion 116 includes any devices, networks, or other computer network resources coupled to computer network 100 but that are not part of the protected portion 114 of computer network 100.

In various embodiments, protected portion 114 includes a gateway 120, although the embodiments are not limited to including a gateway. Gateway 120 is coupled to external portion 116 though an interconnect 112 to a network 110. Network 110 is not limited to any particular type or any given number of networks. In various embodiments, network 110 includes the Internet. In various embodiments, external portion 116 includes one or more external devices 108, such as but not limited to one or more external servers 102A-N. In various embodiments, external devices 108 includes at least one malicious server 104. As used herein, a malicious server includes any device, or any other source coupled to a server, that attempts to exploit a zero-day vulnerabilities using a shellcode attack.

Devices 152A-N represent any number of devices, as illustrated by dotted line 152C, that are coupled to and protected within protected portion 114 of computer network 100. In various embodiments, devices 152A-N are coupled by one or more networks 150, which also couples devices 152A-N to gateway 120 through connection 142. In various embodiments, gateway 120 couples the plurality of devices 154A-N to network 110. The plurality of devices 154A-N are not limited to any number or types of devices, and can include any devices, such as but not limited to computers, servers, and databases that are coupled to an external network 110 through gateway 120.

Devices 152A-N are referred to as being "protected" because these devices are the devices configured to receive the anti-malware protection provided by gateway 120. In various embodiments, anti-malware protection includes detection of shellcode in any files that are intended to be sent into protected portion 114 of computer network 100. In various embodiments, anti-malware protection includes detection of shellcode in any files that are generated, sent from, or that reside on any of the plurality of devices 154A-N within protected portion 114 of computer network 100.

In various embodiments, gateway 120 includes an anti-malware engine 122. In various embodiments, anti-malware engine is operable to provide shellcode detection. In various embodiments, shellcode detection includes use of methods of probabilistic shellcode detection. In various embodiments, one or more configuration settings are stored in configurations 130, which is coupled to anti-malware engine 122. In various embodiments, configurations 130 is operable to store one or more configuration settings used by anti-malware engine 122 in the detection of shellcode, as further described herein. In various embodiments, configurations 130 stores one or more threshold values used in the shellcode detection processes, as further described herein.

In various embodiments, an interconnect 129 provides communications within gateway 120. In various embodiments, an interface 140 is coupled to interconnect 129 and is operable to allow a user to interface with gateway 120, including communication of inputs and outputs made between gateway 120 and interface 140. In various embodiments, interface 140 is operable to allow a user to review and to modify one or more of the configuration settings stored in configurations 130. In various embodiments, interface 140 is operable to provide information to a user concerning whether or not shellcode has been detected in a file entering into or resident within protected portion 114 of computer network 100. In various embodiments, when shellcode has been detected within a file entering into or resident on protected portion 114 of computer network 100, interface 140 is operable to provide a user with some combination of information, warning messages, and reports that are generated by anti-malware engine 122 as a result of the detection of shellcode.

In various embodiments, interface 140 includes memory 141 operable to store machine readable instructions that, when read and executed on a computer, such as but not limited to anti-malware engine 122, or on a computer included in interface 140, execute the functions described herein related to the detection and reporting of shellcode.

In various embodiments, database 144 is coupled to interconnect 129 and is communicatively coupled to anti-malware engine 122. In various embodiments, database 144 is operable to store any combination of known shellcode, known found offsets, or known characteristical shellcode sequences associated with shellcode. In various embodiments, anti-malware engine 122 is operable to access one or more instances of known shellcode, known found offsets, and known characteristical shellcode sequences for use in comparative searches being performed on an arbitrary file being checked to see if the arbitrary file includes shellcode. In various embodiments, any newly discovered shellcode, found offsets, or characteristical shellcode sequences determined to actually be shellcode will be provided and stored in database 144.

In various embodiments, newly discovered shellcode is provided as a result of anti-malware engine 122 determining that an arbitrary file includes shellcode. In various embodiments, newly discovered shellcode is detected by some other anti-malware detection system or systems (not shown in FIG. 1) outside protected portion 114 of computer network 100. In various embodiments, anti-malware detection systems outside protected portion 114 will provide the newly discovered shellcode, newly discovered found offsets, or newly discovered characteristical shellcode sequences to database 144 for storage and later retrieval and use in detecting shellcode.

In this way, protected portion 114 is operable to automatically update its own database 144 as new shellcode files are discovered, either at gateway 120, or from external sources, and is operable to provide newly discovered shellcode, newly discovered characteristical shellcode sequences, and newly discovered found offsets, all that are determined to be associated with shellcode, to other anti-malware detection systems.

It would be understood that anti-malware engine and the shellcode detection provided is not limited to being resident as part of a gateway. The shellcode detection can be provided in a variety of computing environments, including but not limited to network gateways, desktop computers, servers, back-end analysis systems, and within mobile communication devices such as cell phones and Personal Digital Assistants (PDAs). Shellcode detection can be applied anywhere where a device or a system is potentially exposed to any Zero-Day vulnerabilities.

Figure 2:
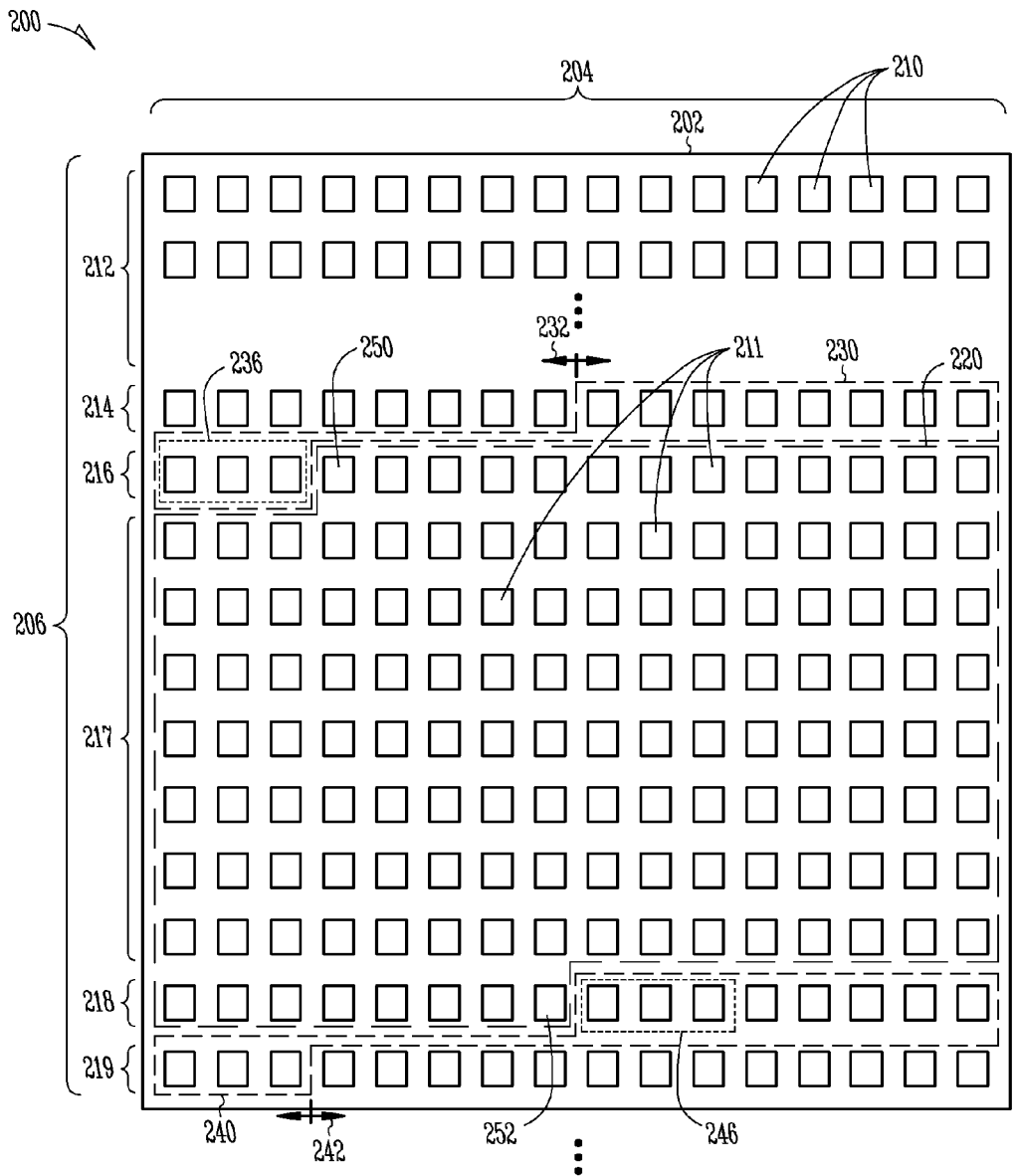
FIG. 2 illustrates a diagram of one possible layout for an arbitrary file according to various embodiments.

FIG. 2 illustrates a diagram 200 of one possible layout for an arbitrary file 202 according to various embodiments. Arbitrary file 202 is considered "arbitrary" because it is not limited to any particular type of file, for example, is not limited to being an executable file or to being a data file. Arbitrary file 202 includes any type of file that has the potential to include shellcode.

In various embodiments, arbitrary file 202 includes a plurality of data blocks 210. Data blocks 210 are not limited to any particularly size data blocks. In various embodiments, data blocks 210 are 8-byte data blocks. In various embodiments, data blocks 210 are 16-byte data blocks. In various embodiments, each of data blocks 210 represents a page of data. A page of data is considered to be the smallest block of data that can be individually addressed during the performance of certain memory operations, such as a read or write operation, performed on the arbitrary file 202.

In various embodiments, the plurality of data blocks 210 are arranged in a plurality of columns 204 and a plurality of rows 206. The number of columns 204 and the number of rows 206 included in arbitrary file 202 is not limited to any particular number of columns and rows.

In various embodiments, arbitrary file 202 includes a candidate area 220. Candidate area 220 includes a subset 211 of the plurality of data blocks 210, the subset 211 of data blocks including the data blocks 210 that are enclosed with the dashed line surrounding candidate area 220. As shown in FIG. 2, candidate area 220 begins on row 216 at data block 250, and includes data block 250 and all of the data blocks to the right-hand side of data block 250 in row 216, all of the data blocks in the plurality of rows 217, and the data blocks within row 218 that are on the left-hand side of data block 252, and data block 252.

The number of data blocks included within a candidate area, such as candidate area 220, is not limited to a particular number of data blocks, and can include any number of data blocks determined to be part of the candidate area 220, as described herein. The first data block 250 within candidate area 220 is not limited to being at any particular position with respect to rows 206 and columns 204 of the arbitrary file, and can occur at any position within arbitrary file 202. The last data block 252 within candidate area 220 is not limited to being at any particular position with respect to rows 206 and columns 204 of the arbitrary file, and can occur at some position following the first data block 250 within arbitrary file 202.

Candidate area 220 is determined to be a candidate area because a candidate area has one or more characteristics to indicate an area that could contain, or may be close to, shellcode. In various embodiments, a determination of a candidate area is performed by scanning an arbitrary file, such as arbitrary file 202, looking for repetitive constructs that are potentially intended to overflow a buffer in a computer memory when the arbitrary file is parsed, rendered or executed, or in general, interpreted. The repetitive constructions are characteristics of buffer overflow vulnerability exploitation, as the attackers usually generate these repetitive constructs from a looping generator tool, rather than including more realistic looking garbage data. In various embodiments, these repeated constructs include long sequences of repeated characters that lead to low overall information entropy. In some embodiments, these repetitive constructs include "NOP" slides solely.

In various embodiments, an algorithm to detect repetitive constructs in an arbitrary file includes:

---

1. Take a first character $a_N$ (at position N), for example from
   "ABCDEFGABCDEFGABCDEFG"
     0       7       14

2. then search for next occurrence of the same character (found at position M);
3. assume the sub-sequence $(a_N, \ldots, a_{M-1})$ is the repetition pattern (of length L = M − N).
4. Compare it to the sub-sequence $(a_M, \ldots, a_{M+L})$ – if equal, advance by L bytes and continue with this step until the comparison fails.
5. If the number of found repetitions is below a given threshold, no match is assumed –
6. otherwise, ensure the repeated sub-sequence leads to a low overall information entropy, as per Equation 1 (see below) with x = {0..255}, $x_i$ = i − 1 i and n = |x|.
7. Determine the first character of the comparison sub-sequence of the last repetition of step 4, that does not match the character at the same offset within the predecessor sub-sequence, and
8. assume the start of shellcode either at this position, or within an offset that preferably is divisible by four and no farther away from the determined position than a total of 16 bytes (in order to skip instruction pointer (EIP) overwrite). If a NOP slide is found at this position, then skip it. The length of the discovered buffer-overflowing construct shall influence the overall probability.

---

In various embodiments, as an alternative to scanning an arbitrary file for repetitive constructs, a determination of a candidate area 220 is performed by looking for data blocks with significantly high entropy. In various embodiments, a set of data blocks is considered to have significantly high entropy if the information entropy of the data blocks exceeds a given threshold value.

In various embodiments, information entropy is continuously calculated, from current position through to a configurable window size, as:

$$H(X) = -\sum_{i=1}^{n} p(x_i) \log_2 p(x_i) \quad \text{Equation 1}$$

where

H(X) is based on the information content or self-information of X, which is itself an arbitrary variable; and $p(x_i) = \Pr(X = x_i)$ is the probability mass function of X. and is calculated with x={0 . . . 255}, $x_i$=i−1 and n=|x| In various embodiments, the data block is a set of 8-bit values. However, blocks are not limited to any particular word size used for calculating their complexity approximations, such as bytes, 16-bit or 32-bit words, and can use different word sizes per block in different parts of the file.

In various embodiments, the implementation of calculating entropy for the data block in an arbitrary file is performed on blocks at fixed positions, rather than on a sliding window.

In various embodiments, as an alternative way to determine if a candidate area 220 exists in an arbitrary file, all or any portion or portion of the arbitrary file is scanned for characteristical shellcode sequences that are known to be associated with shellcode. If such known characteristical shellcode sequences are located within an arbitrary file, the located characteristical shellcode sequences are considered to define a candidate area.

Embodiments are not limited to any one or any particular combination of the techniques described for determining candidate areas. In various, embodiments, a second one or more of these techniques are applied only when a first one of these techniques fails to detect the presence of any candidate areas in a given arbitrary file. In various embodiments, any combination, or all, of these techniques are applied to an arbitrary file regardless of whether any of the previously applied techniques result in the detection of any candidate areas.

In various embodiments, once a candidate area has been detected, a search for function calls and for code branches is performed on the area or areas surrounding the candidate area. Generally, function calls include any instruction that transfers execution to a different instruction, with the ability to return to the next instruction following the calling one. Generally, code branches include any instruction that redirects the execution of the program from the next instruction that would be executed by default to another instruction in the program that is not necessarily the default next instruction that would normally be executed, wherein the another instruction is determined based on the branch instruction.

The area surrounding the candidate area is not limited to any particular area within the arbitrary file 202. In various embodiments, the area surrounding the candidate area 220 includes a number of data blocks proceeding the candidate area 220. This is illustrated as the data blocks included in area 230 in FIG. 2. As shown in FIG. 2, area 230 includes the three blocks 236 at the left-hand side of row 216, and the eight data blocks at the right-hand side of row 214. In various embodiments, area 230 includes data blocks 236 including a NOP slide, as further described herein. As shown in FIG. 2, area 230 includes eleven total data blocks. However, the number of data blocks included in area 230 is not limited to any given number of data blocks, and in different embodiments includes more or less data blocks, as represented by line and double arrows 232.

In various embodiments, the area surrounding the candidate area 220 includes a number of data blocks following the candidate area 220. This is illustrated as the data blocks included in area 240 in FIG. 2. As shown in FIG. 2, area 240 includes the three blocks 246 immediately to the right-hand side of the last data block 252 in candidate area 220, the next eight data blocks including the last five data blocks at the right-hand side of row 218, and the three data blocks on the left-hand side of row 219. In various embodiments, area 240 includes data blocks 246 including a NOP slide, as further described herein. As shown in FIG. 2, area 240 includes eleven total data blocks. However, the number of data blocks included in area 240 is not limited to any given number of data blocks, and in different embodiments includes more or less data blocks, as represented by line and double arrows 242.

In various embodiments, the number of data blocks in area 230 is different from the number of data blocks in area 240. In various embodiments, the number of data blocks in area 230, in area 240, or in both areas 230 and 240 is user configurable, and in some embodiments the value corresponding to the number of data blocks in these areas is stored in a configurations associated with the shellcode detection, such as but not limited to configurations 130 as shown in FIG. 1.

In various embodiments, a search is performed in the areas surrounding the candidate areas 220, such as area 230, area 240, or both area 230 and area 240, for function calls and code branching instructions. In various embodiments, area 230, area 240, or both areas 230 and 240, are searched for known characteristical shellcode sequences. In various embodiments, this search for known characteristical shellcode sequences is performed only if no function calls or code branches were found as a result of searching the areas 230 and 240 surrounding candidate area 220. In various embodiments, the search for known characteristical shell code is performed in addition to the search for function calls and code branching instructions, even if function calls or code branching instructions, or both function calls and code branching instructions, were found during the search of the areas surrounding the candidate area 220.

In various embodiments, each position of a data block determined to be a function call, a code branching instruction, or any other type of characteristical shellcode sequence is designated as a instruction candidate at a found offset, herein shortly referred to as "found offset". A statistical analysis is performed starting at each found offset, For any one of the found offsets, the statistical analysis is used to generate a probability that the given found offset is a start point for actual shellcode. In various embodiments, the generated probability for a given found offset is compared to a threshold probability, and if the generated probability for the given found offset exceeds the threshold probability, a determination is made that the file includes shellcode.

Figure 3:
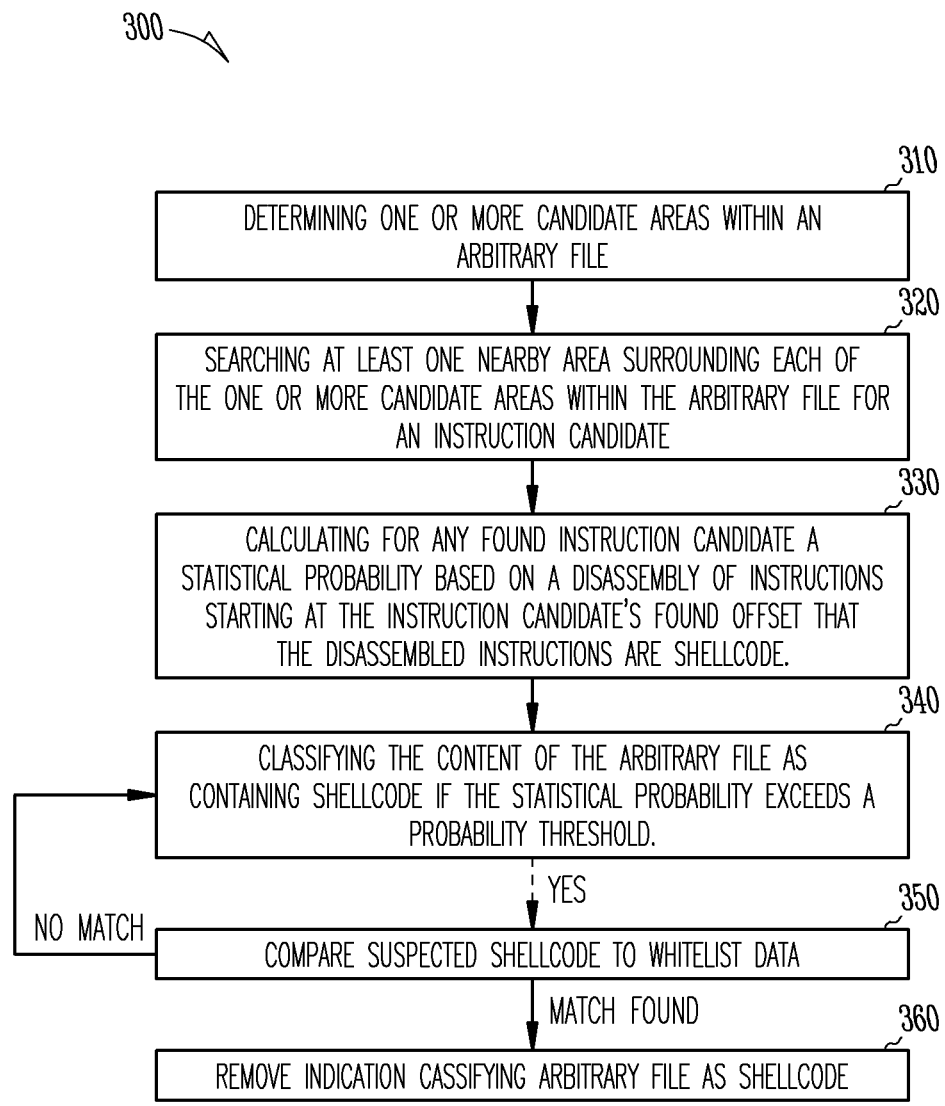
FIG. 3 illustrates a flowchart of one or more methods according to various embodiments.

FIG. 3 illustrates a flowchart 300 of one or more methods according to various embodiments.

At block 310, one or more methods 300 include determining one or more candidate areas within an arbitrary file. In various embodiments, determining one or more candidate areas includes scanning the contents of an arbitrary file to determine if they contain repetitive constructions that are potentially intended to overflow a buffer.

In various embodiments, an arbitrary file having an encrypted file format is decrypted before scanning the contents of the arbitrary file. In various embodiments, an arbitrary file having a compressed file format is decompressed prior to scanning the contents of the arbitrary file. In various embodiments, if a format of the arbitrary file is known, normalization is performed before scanning the contents of the arbitrary file. The following illustrates examples of how code from an arbitrary file could be normalized before scanning is performed.

Example 1

Raw instruction: MOV EAS, 17
The instruction would store the value 17 into the CPU register named "EAX")
An embodiment of a normalized instruction
MOV Register,ImmediateValue
The normalized instruction describes the general operation, but without using an exact value or register)

Example 2

Raw instruction: JZ 200
The instruction, Jump-If-Zero, would jump to a code position that is 200 bytes away, if a previous comparison has set the zero flag.
An embodiment of a normalized instruction in for example 2:
Jcc ImmediateValue
The moralized instruction is Normalized to "Conditional Jump" only, which could include JZ, or JNZ—jump-not-zero, JC—jump-if-carry, and many more type of JUMP instruction.
Once the arbitrary code is normalized, the scanning of the contents can be performed on the normalized version of the code.

Instructions, for example x86 instructions follow one another, or branch in some manner that makes some sense for execution by a processor. For example, malware such as shellcode includes code that must be branched to or otherwise accessed and executed in order to effect the exploitation of the vulnerabilities. Thus, for a given instruction, a probability can be determined that the next sequential instruction will be a particular instruction. In various embodiments, the probabilities are determined based on a predecessor to the given instruction. In various embodiments, the probabilities are developed based on previous-but-one state.

Code can therefore be modeled as a chain of influencing instructions. In various embodiments, generated matching code is treated as an Nth-order Markov Model. In various embodiments, an Nth-order Morkov Model include N=1, and "I" indicates a given instruction in the generated machine code.

For the $1^{st-Order}$ Markov Model:
  instruction $I_n$ depends on $I_{n-1}$, wherein n is an integer representing a relative positions of the Ith instructions in a code sequence.

In a $2^{nd}$-Order Markov Model:
  $I_n$ depends on $I_{n-1}$ and In−2.

Figure 5:
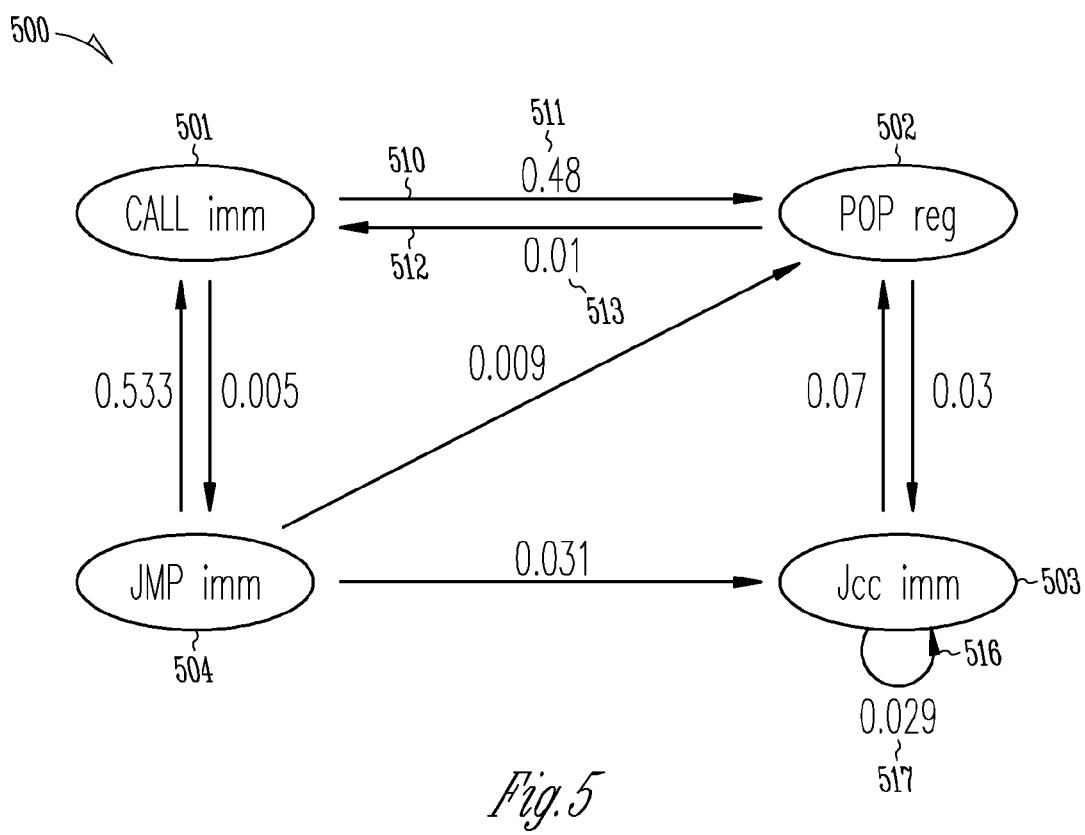
FIG. 5 illustrates an embodiment of a Markov Model for machine code.

FIG. 5 illustrates an embodiment of a Markov Model 500 for machine code. Model 500 a CALL imm instruction 501, a POP reg instruction 502, a Jcc imm instruction 503, and a JMP imm instruction 504, all illustrated by representative ellipses. Each of the instructions 501, 502, 503, and 504 has at least one arrow and an associated probability directed toward the instruction, and at lease one arrow and an associated probability directed away from the instruction.

By way of illustration, the CALL imm instruction 501 has arrow 510 directed away from the CALL imm instruction 501, and directed toward the POP reg 502 instruction. Arrow 510 is associated with probability 511 having a value of 0.48. The arrow 510 and the associated probably 511 represents a value for probability of a sequence of code having a CALL imm instruction 501 having the next sequential type of code instruction executed as the POP reg instruction 501. In this illustration, the value for that probability is 0.48. The POP reg instruction 502 has arrow 512 directed away form the POP reg instruction 502 and towards the CALL imm instruction 501. In another illustration, arrow 512 is associated with probability having a value of 0.01. The arrow 512 and the associated probably 513 represent a value for probably of a sequence of code having a POP reg instruction 502 sequencing to a CALL imm instruction 501 as the next sequentially executed instruction. In this illustration, that probability has a value of 0.01. As shown in FIG. 5, various combinations of arrow and associated probability are used to depict the probability of a given instruction being followed sequentially in a code sequence by a particular given instruction.

In various embodiments, not all instructions are connected directly by arrows and associated probabilities. By way of illustration, the CALL imm instruction 501 and the Jcc imm instruction 503 are not directly linked by any arrow and associated probabilities. In some embodiments, a lack of such linking is expected, as only certain types of instructions can follow other type of instructions, unless the code is corrupted and thus inoperable. However, in building the Markov Model, or any similar model trained from a given training set or human analysts' knowledge and used to determine the likelihood of a sequence observed in an input file, on how probable it is for the observed sequence to fit into the same category as any of the training entities used in generating the model, for use with detection of code execution exploits, the listing of instructions is based on the premise that even shellcode or malicious code (types of malware) intends to be operational in order to achieve its intended purpose of ultimately executing the shellcode or malicious code on the system under attack.

FIG. 6 illustrates a table 600 of values representing a Markov Model for code. Table 600 includes a plurality of row 602 and a plurality of columns 610, 612, and 614. In various embodiments, column 610 includes a designation in each of the plurality of rows 602 that includes a designation for a current instruction 604. Column 614 includes a designation in each of the plurality of rows 602 that represents an instruction that is one possible next sequential instruction for the given instruction in the same corresponding row 602. Column 612 includes in each row a value representative of the probability that, for the given instruction in column 610 for a particular row, the probability that the next sequential instruction to be executed in a given sequence of code instructions following the given instruction in column 610 will be the instruction included in column 614 for that same row.

By way of illustration, row 620 includes the uppermost row in table 600. A CMP reg, mem instruction is included in column 610 of row 620, a value of 97.4% appears in column 612 of row 620, and a Jcc imm instruction is included in column 614 of row 620. Based on these entries to table 600 for row 620, there is a 97.4% chance (a probability of 0.974) that the next sequentially executed instruction in a sequence of code following a CMP reg, mem instruction will be a Jcc imm instruction.

In various embodiments, a given instruction can be entered into more than one row of the plurality of rows in table 600 in order to provide probabilities for different instructions that could follow the given instruction, wherein each combination of the given instructions the designated probability for a given next sequential instruction are included in separate rows. As illustrate in table 600, instructions that appears in column 614 can also be present in one or more rows in column 610 in order to provide probabilities for these instructions to be followed by one or more particular instructions to be executed next in a sequence of code instructions.

In various embodiments, the entries included in table 600 are use as the basis for one or more Nth order Markov Models, including one or more sequence chains. In various embodiments, the sequence chains include a Markov Model 500 as illustrated in FIG. 5.

Once the table 600 is constructed, it can be stored in a detection database, such as but not limited to the database 144 as shown in FIG. 1.

In various embodiments, a sequence of two or more instructions are generated through disassembly of arbitrary code included in a file. In various embodiments, the sequence of instructions is generated using a linear sweep, that is, disassembly of one consecutive instruction after another as it is received in the arbitrary file. In various embodiment, the sequence of instructions is generated using recursive traversal, that is, following branches in the sequence of instructions dynamically. In various embodiments, emulation of a virtual CPU and/or memory may be performed between disassembly and lookup against the model; the emulation may be limited to specific instructions. In various embodiments, only some conditional branches included in the sequence of instructions are followed. In various embodiment, the determination as to whether or not to follow a given conditional branch is determined based on a set of transversal decision rules that are developed and stored in advance, and referred to when performing the recursive traversal of the sequence of instructions, or both directions of a conditional branch may be taken consecutively or in parallel.

In various embodiments, as branches are taken, the sequence of branches taken is also remembered. As the recursive traversal continues, a probability is determined for the sequence of instructions based on the Markov Model for the Nth-order Markov Model being compared to the sequence of instructions.

In various embodiments, the probability is compared to a set of instruction known to be shellcode, and if the probability exceeds a threshold probability, then the arbitrary file is deemed to be shellcode or malicious code.

Figure 7:
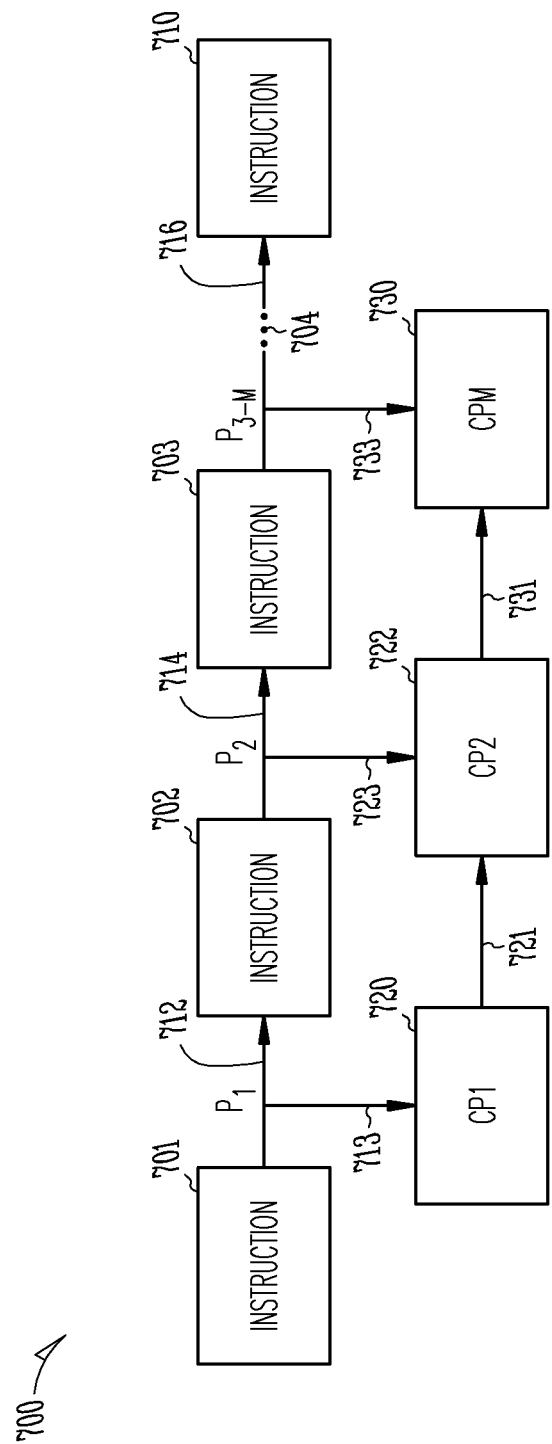
FIG. 7 illustrates a sequence of code instructions and corresponding calculated cumulative probabilities.

FIG. 7 illustrates a sequence 700 of code instructions and corresponding calculated cumulative probabilities. In various embodiments, sequence 700 includes a plurality of code instructions 701, 702, 703 through 710. Sequence 700 is not limited to any particular number of instructions included in the sequence. In some embodiments, sequence 700 includes as few as two instructions. In various embodiments, sequence 700 includes any integer number of instructions greater than two, as indicated by dotted line 704 between instruction 702 and 710.

As shown in FIG. 7, instruction 712 is followed in sequence instruction 702, as indicated by arrow 712, and instruction 702 is followed in sequence by instruction 703, and indicated by arrow 714. Instruction 703 is followed in sequence by one or more sequentially executed instructions, as represent by instruction 710 and arrow 716.

Each of arrows 712 and 714 represent a transition between instructions, and are associated with a probability. Arrow 712 represents the transition from instruction 710 to instruction 702, and is associated with a probability P1. Probability P1 includes a value representing the probability that the particular instruction represented by instruction 702 would follow the given instruction represented by instruction 701. The probability value for P1 in some embodiments is determined based on a table, such as table 600 of FIG. 6, that includes a predetermined probability value, for example in one of rows 602 in FIG. 6 of the transition from the instruction represented by instruction 701 to instruction 702. At instruction 702, a cumulative probability CP1 and be calculated and stored as a value 720 in a memory location or a cumulative probability register. The value of CP1 is some embodiments is merely the value of P1 in sequence 700 because there has only been one transient 712 included in sequence 700 to arrive at instruction 702.

Continuing with the illustration, Arrow 714 represents the transition from instruction 702 to 703, and is associated with a probability P2. Probability P2 includes a value representing the probability that the particular instruction 703 would follow the given instruction represented by instruction 702. Again, the probability value for P2 in some embodiments is determined based on a table such as tale 600 of FIG. 6, that includes a predetermined probability value for the transition between instructions 702 and 703. At instruction 703, a cumulative probability CP2 can be calculated and stored as a value 722 based on the value 720 of CP1 represented by arrow 721, and the additional value of P2, as represented by arrow 723. The value 722 can be stored in a memory location or a cumulative probability register. The method for calculating value 722 is not limited to any particular type of method or calculation. In some embodiments, the value 722 is calculated using Bayer's formula as described herein.

The process of sequentially transitioning to another instruction and calculating for each transition a value of the cumulative probability of the sequence 700 is represented by transitions 716 representing one or more transitions, P3-M representing the one or more probability values associated with the one or more transitions represented by arrow 716, and the value 730 representative of the calculated cumulative probability representing a value for the combination of the value 722 for CP2 and the probability P3-M represented by arrow 733. In various embodiments, value 730 represents a final cumulative probability value for the sequence of code instructions represented by sequence 700 when executed in the sequential order represented by the transitions 712, 714, and 716 in FIG. 7.

In various embodiments, the value 730 for the cumulative probability M is compared to a threshold probability to determine if sequence 700 is deemed to be malicious code. In various embodiments, if value 730 exceeds, or in some embodiments is equal to or greater than the threshold probability, sequence 700 is determined to be malicious code.

In various embodiments, scanning the contents of the arbitrary file includes looking for blocks of data with significantly higher entropy. Significantly higher entropy in some embodiments is determined by comparing a value related to entropy for a given set of data blocks to a threshold value, and if the entropy for the given set of data blocks exceeds the threshold value, the entropy of the given set of data blocks is consider to be significantly high. In various embodiments, the average entropy is continuously calculated for the sum of the data blocks that have been scanned so far, and when a data block is encountered that significantly deviates from the average entropy, it is considered to be significantly higher, too. In various embodiments the entropy for the given set of data blocks is calculated on a sliding window block, rather than on blocks at fixed offsets.

In various embodiments, scanning the contents of the arbitrary file includes scanning for characteristical shellcode sequences within the contents of the arbitrary file.

At block 320, one or more methods 300 include searching at least one nearby area surrounding any of the one or more candidate areas found within the arbitrary file for an instruction candidate.

In various embodiments, searching the at least one nearby area surrounding any of the one or more candidate areas includes searching an area proceeding the candidate area, searching an area following the candidate area, or searching both an area preceding and an area following the candidate area. In various embodiments, searching the nearby area surrounding any of the one or more candidate areas includes searching the nearby areas for function calls. In various embodiments, the function call is an API function, such as but not limited to a "CALL" or a "JMP" instruction. In various embodiments, searching the nearby areas surrounding any one of the one or more candidate areas includes searching the nearby areas for code branching instructions. In various embodiments, searching the nearby areas surrounding any of the one or more candidate areas includes searching the nearby areas for characteristical shellcode sequences. In various embodiments, the characteristical shellcode sequence is a decoder loop.

At block 330, one or more methods 300 include calculating for any found instruction candidate a statistical probability based on a disassembly of instructions starting at the instruction candidate's found offset that the disassembled instructions are shellcode.

In various embodiments, disassembly of the instructions starts at the found offset and includes a recursive traversal methodology, including following branches and method calls dynamically, as opposed to a linear sweep disassembly approach that simply disassembles one instruction after the other linearly. In various embodiments, information is stored on code already disassembled, or on branches already taken, in order to avoid following a given branch over and over again.

In various embodiments, disassembly includes backwards disassembly. In various embodiments, backward disassembly includes starting at a given offset N, picking some number of previous M bytes, such as the previous 8 bytes, and disassembling each of the 8 possible instruction variants, by length, within that window, starting at the offset N−7 of length 8, stepping by one through to the offset N of length 1, deciding for the one instruction with the highest shellcode probability, and then continue at offset N+1 (minus the length of the latter instruction). In various embodiments, if all instructions— [N−7 . . . N]—have a shellcode probability of less than 50%, stop the backward disassembly.

In various embodiments, calculating a statistical probability for a found offset includes making a determination of a probability, as to how likely it is to find a given instruction in regular X86 machine code at all. By way of illustration, certain instructions such as but not limited to a "MOV" or a "CALL" instruction are assigned a rather high probability, while "IN" and "OUT" instructions are assigned a low probability. An illustrative mapping table of instruction-to-shellcode probability mappings in various embodiments, would be implemented as Table 1 as follows:

TABLE 1

| Command | Likelihood of being shellcode (50 = neutral) |
|---|---|
| call rel | 90 |
| push imm | 80 |
| push reg | 60 |
| pop reg | 55 |
| jmp imm | 60 |
| cmp [reg], imm | 60 |
| test reg, reg | 55 |
| lea reg, [reg + displ] | 70 |
| xor reg, reg | 70 |
| add reg, reg | 53; only if opcode is not 0-s.b. otherwise... |
| add reg, imm | 55 |
| sub reg, imm | 53 |
| add r/mem8, reg8 | 5; because of 0 opcode |
| add r/mem16, reg16 | 15 |
| lodsd | 75 |
| ret | 53 |
| out imm, reg | 10 |
| in reg, imm | 10 |

In various embodiments, the probability of any given opcodes is determined based on the likelihood that the opcode is found in or is associated with shellcode. Illustrative opcodes that are rarely found in shellcode are XCHG, BOUND, ARPL, LES, LDS, AAM, AAD, XLAT, HLT, CMC, INT (rare on Win32, usually only on Unix), SBB, IMUL, INS, OUTS, CBW, CWD, INT 3, FWAIT, SAHF, LAHF, SCAS, INTO, IRET, STC, CLI, STI, CLD and STD. Any instruction with a LOCK prefix is rare as well, as shellcode authors usually don't need to care about thread safety. The whole "escape to coprocessor" instruction set (D0h through to DFh) is unlikely to occur in shellcode as well. And all two-byte opcodes that match 0Fh ??, but not 0Fh 20h through to 0Fh 27h, not 0Fh 80h through to 0Fh 8Fh, not 0Fh A0h and not 0Fh A1h, have a commonly low likelihood of 30.

In various embodiments, independent of the instruction opcode, a displacement in the range from 4 to 20h shall further increase the probability, while a displacement of 10000000h and higher should lower the probability significantly. A "displacement" is an Intel Architecture-specific memory addressing extension; when an instruction accesses an address at register+offset, like EAX+10000h, the latter is the instruction operand's displacement.

In various embodiments, a given predetermined number of instructions are included in the disassembly starting at any given found offset, and a probability is determined for each instruction. The individual instructions' shellcode probabilities are summed up using Bayes' formula to generate an overall probability of any given stream of instructions to be realistic machine code. Bayes' formula relates the conditional and marginal probabilities of stochastic events A and B:

$$Pr(A|B) = \frac{Pr(B|A)Pr(A)}{Pr(B)}$$
$$\propto L(A|B)Pr(A)$$

where L(A|B) is the likelihood of A given fixed B. Notice the relationship:

$$Pr(B|A)=L(A|B).$$

Each term in Bayes' formula has a conventional name:
- Pr(A) is the prior probability or marginal probability of A. It is "prior" in the sense that it does not take into account any information about B.
- Pr(A|B) is the conditional probability of A, given B. It is also called the posterior probability because it is derived from or depends upon the specified value of B.
- Pr(B|A) is the conditional probability of B given A.
- Pr(B) is the prior or marginal probability of B, and acts as a normalizing constant.

The overall probability provides a percentage probability that an arbitrary file contains at least realistic machine code or even shellcode—given the file type and/or the location of the finding, its existence usually implies it is shellcode. In various embodiments, a user may compare the overall probability to a threshold value M to determine if the arbitrary file includes shellcode. For example, if an overall statistical probability for the arbitrary file equals or exceeds a threshold value M, the arbitrary file is considered to include shellcode.

In various embodiments, the variance of instructions shall further influence the shellcode probability: if the same instruction occurs consecutively for several times, it is less likely to be actual machine code; on the other hand, actual shellcode often uses only a relatively small portion of the complete Intel IA32 instruction set—with instructions such as MOV and INC being used way more often than others—, so that the variance should also not be too high. To verify this, the algorithm shall compute the information entropy of all instruction opcodes x={JMP, MOV, ADD, JMP, INC, INC . . . } disassembled so far (including two-byte opcodes), and bail out as soon as the entropy H(X) leaves a defined window.

At block 340, one or more methods 300 include classifying the content of the arbitrary file as containing shellcode if the statistical probability exceeds a probability threshold.

Because in various embodiments, the system and methods include the use of probability to determine if a file is deemed to be malicious, there is a possibility of providing a false positive. A false positive occurs when the content of an arbitrary file being operated on to determine if the arbitrary file includes shellcode provides an indication that the arbitrary file does include shellcode or other malicious code, when in fact the arbitrary file does not include shellcode or malicious code. The number and likelihood of providing a false positive is governed by multiple factors, including the threshold probability levels set by a user or system administrator to indicate what value or ranges of values for probabilities will be used to determined when shellcode or malicious code is present in an arbitrary file. For example, in various embodiments a lower threshold level can result in a higher likelihood of a given arbitrary file being examined for malicious code having a probability for malicious code that exceeds the threshold value.

In such instances, when an indication of shellcode or malicious code is deemed to be present in an arbitrary file based on a calculated probability associated with the arbitrary file, the arbitrary file can be inspected and analyzed to determine were and if the arbitrary file in fact includes shellcode or malicious code. If a determination is made that the arbitrary file is not in fact malicious code, the arbitrary file, or a particular portion of the arbitrary file, that generated the false positive can be whitelisted. In various embodiments, whitelisting an arbitrary file, or a portion of an arbitrary file, includes determining the portion of the arbitrary file that generated the false positive, and storing that sequence of code—whether the original or the normalized sequence—, in a memory such as but not limited to a database, such as the detection database 144 as shown in FIG. 1.

Referring again to FIG. 3, in various embodiments if an arbitrary file is classified as shellcode, method 300 at 350 includes comparing suspected shellcode to known whitelisted instruction sequences, known whitelisted media types, or both. In various embodiments, if a match is found between the suspected shellcode and the whitelisted instruction sequences or the whitelisted media types, then method 300 processes to 360, including removing the indication classifying the arbitrary file as shellcode.

In various embodiments, if no match is found is found between the suspected shellcode and the whitelisted instruction sequences or the whitelisted media types, then method 300 proceeds back to 340, including classifying the content of the arbitrary file as containing shellcode or other malicious code.

In various embodiments, when a portion of any arbitrary file that is being tested to determine if it includes shellcode or other malicious code, and a positive indication for shellcode or malicious code is detected, the arbitrary file, or the portion of the arbitrary file that caused the positive indication, can be compared to the whitelist to see if the arbitrary file or portion of the arbitrary file could be a false positive. In various embodiments, if an arbitrary file, or a portion of an arbitrary file, that has generated a positive indication for shellcode or malicious code is compared to and matches with an entry located in the whitelist, the file can be considered to have provided a false positive. In various embodiments, this removal of an indication that the arbitrary file is shellcode base on using the whitelist to determine that a false positive has occurred allows the arbitrary file originally indicated as including shellcode or malicious code be accepted by the security gateway that is providing the malware protection, and to allow the file to proceed beyond the gateway into the system being protected by the malware detection.

In various embodiment, if an arbitrary file is determined to be of a particular media type, the media type can be checked against the whitelist to see if the particular media type is whitelisted. Based on finding a whitelisting for the media type for a given arbitrary file, the scanning for malicious code for the particular media type file is not performed. By way of illustration, files that solely include a JPEG image, which is a commonly used method of compression for photographic images, could be whitelisted in the database used in the detection of malicious code to indicate a type of file that does not normally, or can not, include shellcode or malicious code. In this illustration, when a JPEG image file is received, no scanning of the file is performed, as it is of a media type included in the whitelist. Bypassing the scanning of these whitelisted files results in a savings of computer resources and in speeding up of the processing of files.

Figure 4:
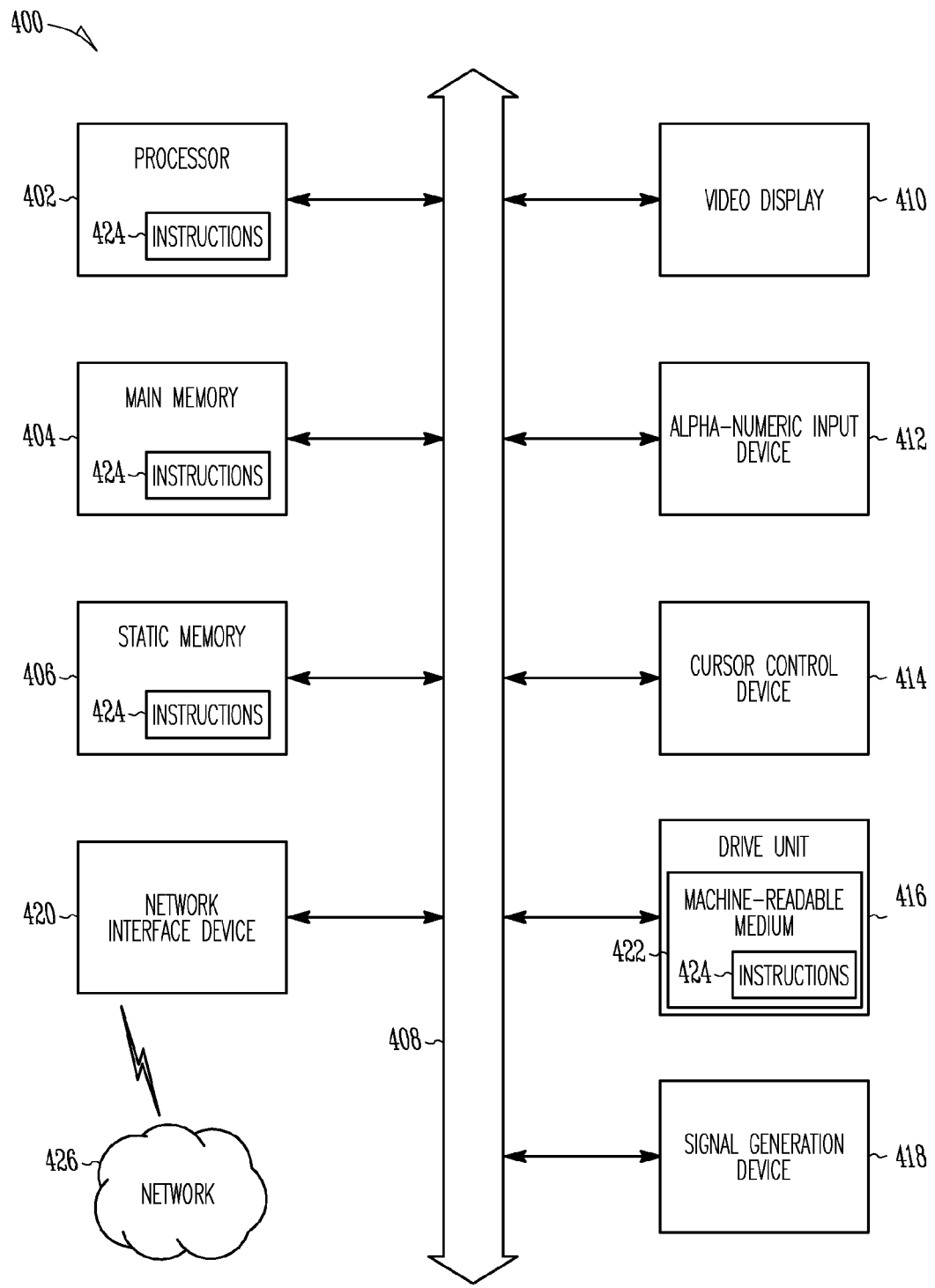
FIG. 4 illustrates an interface for a computer network according to various embodiments of the present invention.

FIG. 4 illustrates an interface 400 for a computer network according to various embodiments. In various embodiments, interface 400 is an interface to a device or a gateway operable to provide shellcode detection, such as but not limited to interface 140 shown in FIG. 1. In various embodiments, interface 400 is a diagrammatic representation of a machine in the form of a computer system within which a set of instructions is stored on a memory device and which, when executed, cause the machine to perform any one or more of the methodologies discussed herein. In some embodiments, the machine operates as a standalone device. In some embodiments, the machine is connected (e.g., using a network) to other machines. In a networked deployment, the machine operates in the capacity of a server or a client user machine in server-client user network environment, or as a peer machine in a peer-to-peer (or distributed) network environment.

In various embodiments, the machine comprises a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, IP telephone, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

In various embodiments, the interface 400 includes any combination of a processor 402 (e.g., a central processing unit (CPU), a graphics processing unit (GPU), or both), a main memory 404 and a static memory 406, which communicate with each other via a bus 408. In various embodiments, interface 400 includes a video display unit 410 (e.g., a liquid crystal display (LCD), a flat panel, a solid state display, or a cathode ray tube (CRT)). In various embodiments, interface 400 includes any combination of an input device 412 (e.g., a keyboard), a cursor control device 414 (e.g., a mouse), a disk drive unit 416, a signal generation device 418 (e.g., a speaker) and a network interface device 420.

In various embodiments, the disk drive unit 416 includes a machine-readable medium 422 on which is stored one or more sets of instructions (e.g., software 424) embodying any one or more of the methodologies or functions described herein, including but not limited to those methods illustrated in FIG. 3. In various embodiments, the instructions 424 are stored in, completely or at least partially, within the main memory 404, the static memory 406, and/or within the processor 402 during execution thereof. In various embodiments, the main memory 404 and the processor 402 also constitute a machine-readable media. In various embodiments, the instructions 424 are further transmitted or received over a network 426 via the network interface device 420.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the various embodiments described. The term "machine-readable medium" shall accordingly be taken to include, but not be limited to, solid-state memories, optical and magnetic media, and carrier wave signals.

Various embodiments include a method of detecting shell code in an arbitrary file comprising determining where one or more candidate areas exist within an arbitrary file, searching at least one nearby area surrounding each of the one or more candidate areas within the arbitrary file for an instruction candidate, and calculating for any such instruction candidate a statistical probability based on a disassembly of instructions starting at a found offset for the instruction candidate that the disassembled instructions are shellcode.

Various embodiments include a gateway comprising an anti-malware engine operable to scan an arbitrary file and to determine if any candidate areas exist within the arbitrary file, for any given candidate area located within the arbitrary file, search at least one nearby area surrounding the candidate area for any instruction candidates, and for any such instruction candidates, calculate a statistical probability based on one or more disassembled instructions starting at a found offset of the instruction candidate to determine a likelihood that the arbitrary file includes shellcode.

Various embodiments include a method of detecting shellcode in an arbitrary file comprising scanning an arbitrary file to determine if any candidate areas exist within the arbitrary file, for any candidate areas found in the arbitrary file, first searching the areas surrounding the any candidate areas to determine if any function calls or any code branching instructions exist in the areas surrounding the any candidate areas, and if no function calls and no code branching instructions are found, searching the areas surrounding the any candidate areas for known characteristical shellcode sequences.

Various embodiments include a computer network comprising a gateway including an anti-malware engine operable to perform the following: receiving an arbitrary file, scanning the arbitrary file for repetitive constructs that are potentially intended to overflow a buffer, determining if any function calls or any code branching instructions exist in the areas surrounding the repetitive constructs, and generating a statistical probability representing the likelihood that the arbitrary file includes shellcode by performing a statistical analysis of the instructions starting at each found offset to generate an overall shellcode probability for the instructions starting at the each found offset.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

The Abstract is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A non-transitory computer readable storage device comprising instructions stored thereon to cause one or more processors to:
   determine where one or more candidate areas exist within an arbitrary file;
   search at least one nearby area in front of or after each of the one or more candidate areas within the arbitrary file for an instruction candidate;
   disassemble instructions starting at a found offset for the instruction candidate to create a disassembled instruction set, the found offset reflecting a location of the instruction candidate within the arbitrary file;
   normalize at least a portion of the disassembled instruction set to create a normalized instruction set;
   scan the normalized instruction set to determine if the normalized instruction set reflects that the disassembled instruction set has a probability of containing shellcode;
   calculate a statistical probability that the instruction candidate is associated with shellcode for normalized instruction sets associated with disassembled instruction sets that were determined to reflect a probability of containing shellcode, wherein statistical probabilities are not calculated if the normalized instruction set reflects that the disassembled instruction set has no probability of containing shellcode;
   for a given stream of instructions starting at the found offset, map an instruction-to-shellcode probability to each instruction in the given stream of instructions; and
   sum the mapped instruction-to-shellcode probability for each instruction using Bayes' formula to generate an overall probability.

2. The non-transitory computer readable storage device of claim 1, further comprising instructions to cause the one or more processors to:
   classify the arbitrary file as containing shellcode if the statistical probability exceeds a probability threshold.

3. The non-transitory computer readable storage device of claim 1, further comprising instructions to cause the one or more processors to determine if the instruction candidate at the found offset is a code branching instruction or a function call.

4. The non-transitory computer readable storage device of claim 1, further comprising instructions to cause the one or more processors to determine if the instruction candidate at the found offset is similar to the start of a known characteristical shellcode sequence.

5. The non-transitory computer readable storage device of claim 1, wherein the instructions to cause the one or more processors to determine where one or more candidate areas exist within the arbitrary file include instructions to cause the one or more processors to:
   scan the arbitrary file looking for repetitive constructs, the repetitive construct having a potential of overflowing a buffer in a computer memory when the arbitrary file is parsed, rendered or executed.

6. The non-transitory computer readable storage device of claim 1, wherein the instructions to cause the one or more processors to search at least one nearby area surrounding each of the one or more candidate areas within the arbitrary file include instructions to cause the one or more processors to:
   configure a number of data blocks to be included in the at least one nearby area.

7. The non-transitory computer readable storage device of claim 1, wherein the instructions to cause the one or more processors to calculate a statistical probability include instructions to cause the one or more processors to:
   disassemble the instructions starting at the found offset by following branches and method calls dynamically.

8. The non-transitory computer readable storage device of claim 1, further comprising instructions to cause the one or more processors to classify the arbitrary file as containing shellcode if the overall probability exceeds a threshold value.

9. The non-transitory computer readable storage device of claim 1, further comprising instructions to cause the one or more processors to:
   create a Markov Model for use in determining a probability of associated shellcode for a sequence of the disassembled instructions;
   classify the arbitrary the as containing shellcode based at least in part on the determined probability.

10. A gateway comprising:
    a memory comprising instructions stored therein; and
    one or more processors communicatively coupled to the memory to configure the one or more processors to operate an anti-malware engine, the anti-malware engine operable to:
    scan an arbitrary file and to determine if any candidate areas exist within the arbitrary file;
    for any given candidate area located within the arbitrary file, search at least one nearby area in front of or after the candidate area for any instruction candidates; and
    for each instruction candidate:
      disassemble instructions starting at a found offset to create a disassembled instruction set, wherein the found offset reflects a location of the each instruction candidate within the arbitrary file;
      normalize at least a portion of the disassembled instruction set to create a normalized instruction set;
      scan the normalized instruction set to determine if the normalized instruction set reflects that the disassembled instruction set has a probability of containing shell code; and
      calculate a statistical probability that the instruction candidate is associated with shellcode for normalized instruction sets associated with disassembled instruction sets that were determined to reflect a probability of containing shellcode, wherein statistical probabilities are not calculated if the normalized instruction set reflects that the disassembled instruction set has no probability of containing shellcode,
    wherein the anti-malware engine is operable to access known characteristical shellcode sequences stored in a database coupled to the anti-malware engine, and to scan the arbitrary file for the known characteristical shellcode sequences.

11. The gateway of claim 10, further including a configurations coupled to the anti-malware engine, the configurations operable to store one or more threshold values used by the anti-malware engine in at least one shellcode detection process.

12. The gateway of claim 10, wherein the anti-malware engine is operable to output warning messages to an interface coupled to the anti-malware engine when the arbitrary file is determined to include shellcode.

13. The gateway of claim 10, wherein the gateway couples at least one protected device to the Internet.

14. The gateway of claim 10, wherein the anti-malware engine is operable to access known whitelisted instruction sequences and whitelisted media types stored in a database coupled to the anti-malware engine, and to bypass scanning of known code sequences that match either one of the whitelisted instruction sequences or at least one of the whitelisted media types stored in the database.

15. A non-transitory computer readable storage device comprising instructions stored thereon to cause one or more processors to:
   scan an arbitrary file to determine offset locations of one or more candidate areas that exist within the arbitrary file, the offset locations identifying starting and ending locations of each of the one or more candidate areas within the arbitrary file;
   for at least one of the one or more candidate areas found in the arbitrary file, first search the areas surrounding the at least one candidate area to determine if any function calls or any code branching instructions exist in the areas surrounding the at least one candidate area, wherein the areas surrounding the at least one candidate area comprise areas in front of or after the at least one candidate area;
   if no function calls and no code branching instructions are found, search the areas surrounding the at least one candidate area for known characteristical shellcode sequences by disassembling one or more instructions from the surrounding areas, normalizing the disassembled one or more instructions to create one or more normalized instructions, and scan the one or more normalized instructions to determine if the one or more normalized instructions reflect that the one or more disassembled instructions represent shell code; and
   scan the arbitrary file for data blocks with high information entropy compared to a threshold value when no known characteristical shellcode sequences are found.

16. The non-transitory computer readable storage device of claim 15, further comprising instructions to cause the one or more processors to:
   calculate an information entropy for a given portion of the arbitrary file when no known characteristical shellcode sequences are found for the given portion of the arbitrary file, and end processing of the given portion of the arbitrary file if the calculated information entropy for the portion of the arbitrary file is either above or below a set of configured thresholds.

17. The non-transitory computer readable storage device of claim 16, wherein the instructions to end the processing of the given portion of the arbitrary file include instructions to:
   scan another given portion of the arbitrary file,
   calculate an information entropy for the another given portion of the arbitrary file, and end processing of the another given portion of the arbitrary the if the calculated information entropy for the another given portion of the arbitrary file is either above or below the set of configured thresholds.

18. The non-transitory computer readable storage device of claim 15, wherein the instructions to cause the one or more processors to scan the arbitrary file include instructions to scan the arbitrary file for repeated constructs that include long sequences of repeated characters.

19. The non-transitory computer readable storage device of claim 18, wherein the instructions to cause the one or more processors to scan the arbitrary file for repeated constructs include instructions to cause the one or more processors to:
   take a first character $a_N$ at position N in the arbitrary file;
   search for next occurrence of the first character, which is found at position M;
   use a sub-sequence $(a_N, \ldots, a_{M-1})$ as a repetition pattern having a length L=M−N;
   compare the repetition pattern to the sub-sequence $(a_M, \ldots, a_{M+L})$, and if equal, advance by L bytes and continue with this comparing until the comparison fails in order to determine a number of found repetitions; and
   if the number of found repetitions is below a given threshold, determine that no match is found.

20. The non-transitory computer readable storage device of claim 15, wherein the instructions to cause the one or more processors to determine if any function calls or code branching instructions are found in the areas surrounding the at least one candidate area, comprise instructions to cause the one or more processors to:
   disassemble a number of instructions starting at the function call or at the code branching instruction,
   calculate a probability for each of the instructions disassembled;
   sum each of the calculated probabilities using Bayers' formula to generate an overall probability; and
   determine that the arbitrary file includes shellcode when the overall probability exceeds an threshold value.

21. A computer network comprising:
   a gateway device comprising memory and one or more processors communicatively coupled to the memory; and
   a database coupled to the gateway device, the database including memory operable to store one or more known shellcode sequences and to provide the one or more known shellcode sequences to an anti-malware engine for comparison to instructions in an arbitrary file, wherein the memory stores instructions to cause the one or more processors to be configured to include the anti-malware engine, the anti-malware engine operable to:
   receive the arbitrary file;
   scan the arbitrary file for repetitive constructs that have a potential to overflow a buffer in a computer memory when the arbitrary file is parsed, rendered or executed;
   determine if any function calls or any code branching instructions exist in the areas surrounding the repetitive constructs, wherein areas surrounding the repetitive constructs comprise areas in front of or behind the repetitive constructs with respect to a location of the repetitive constructs within the arbitrary file; and
   generate a statistical probability representing the likelihood that the arbitrary file includes shellcode by performing a statistical analysis of the instructions starting at each found function call or branching instruction to generate an overall shellcode probability for the instructions starting at the each found function call or branching instruction, the statistical analysis of the instructions including disassembling instructions to create a disassembled instruction set, normalizing at least a portion of the disassembled instruction set to create a normalized instruction set, and scanning the normalized instruction set.

22. The computer network of claim 21, further including a configurations coupled to the anti-malware engine, the configurations operable to store one or more probability threshold settings used by the anti-malware engine in determining whether a given statistical probability generated for the arbitrary file indicates that the arbitrary the includes shellcode.

* * * * *

UNITED STATES PATENT AND TRADEMARK OFFICE
CERTIFICATE OF CORRECTION

| | | |
|---|---|---|
| PATENT NO. | : 8,621,626 B2 | Page 1 of 1 |
| APPLICATION NO. | : 12/627786 | |
| DATED | : December 31, 2013 | |
| INVENTOR(S) | : Christoph Alme | |

It is certified that error appears in the above-identified patent and that said Letters Patent is hereby corrected as shown below:

In the Drawings

On sheet 3 of 7, in Figure 3, Reference Numeral 360, line 1, delete "CASSIFYING" and insert --CLASSIFYING--, therefor.

In the Claims

In column 18, line 31, in claim 9, delete "the" and insert --file--, therefor. (2nd occurrence)

In column 19, line 64, in claim 17, delete "the" and insert --file--, therefor. (2nd occurrence)

In column 20, line 32, in claim 20, delete "Bayers'" and insert --Bayes'--, therefor.

In column 21, line 9, in claim 22, delete "the" and insert --file--, therefor. (2nd occurrence)

Signed and Sealed this
Seventeenth Day of June, 2014

Michelle K. Lee
*Deputy Director of the United States Patent and Trademark Office*